United States Patent
Rahman et al.

(10) Patent No.: US 6,473,271 B1
(45) Date of Patent: Oct. 29, 2002

(54) AERODYNAMICALLY STREAMLINED ACTUATOR ARM FOR DISC DRIVES

(75) Inventors: Mohamed Mizanur Rahman, San Jose, CA (US); Hans Leuthold, Santa Cruz, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 61 days.

(21) Appl. No.: 09/590,559

(22) Filed: Jun. 9, 2000

Related U.S. Application Data

(60) Provisional application No. 60/138,702, filed on Jun. 11, 1999.

(51) Int. Cl.[7] ................................................. G11B 5/55
(52) U.S. Cl. ...................................................... 360/266
(58) Field of Search ............................... 360/266, 244.2

(56) References Cited

U.S. PATENT DOCUMENTS

| | | | | |
|---|---|---|---|---|
| 4,175,275 A | * | 11/1979 | Schaefer | 360/104 |
| 4,352,133 A | * | 9/1982 | Hager | 360/106 |
| 5,126,904 A | * | 6/1992 | Sakurai | 360/104 |
| 5,790,511 A | * | 8/1998 | Juso et al. | 369/244 |
| 5,801,905 A | * | 9/1998 | Schirle et al. | 360/104 |
| 5,854,725 A | * | 12/1998 | Lee | 360/106 |
| 6,002,552 A | * | 12/1999 | Leung | 360/104 |

* cited by examiner

Primary Examiner—Brian E. Miller
(74) Attorney, Agent, or Firm—Derek Berger

(57) ABSTRACT

A disc drive actuator arm is an extended arm having forward edge to engage fluid flow due to rotation of the disc, a rear edge, and a top surface and a bottom surface along which fluid flows. The top and bottom surfaces join the forward and rear edges, and the fluid flow has a boundary layer along the top surface and the bottom surface. The arm has an aerodynamic cross-section so that the fluid flow boundary layer does not separate at the forward and rear edges. The fluid flow past the arm from the forward edge to the rear edge is substantially laminar to prevent vortex shedding.

1 Claim, 5 Drawing Sheets

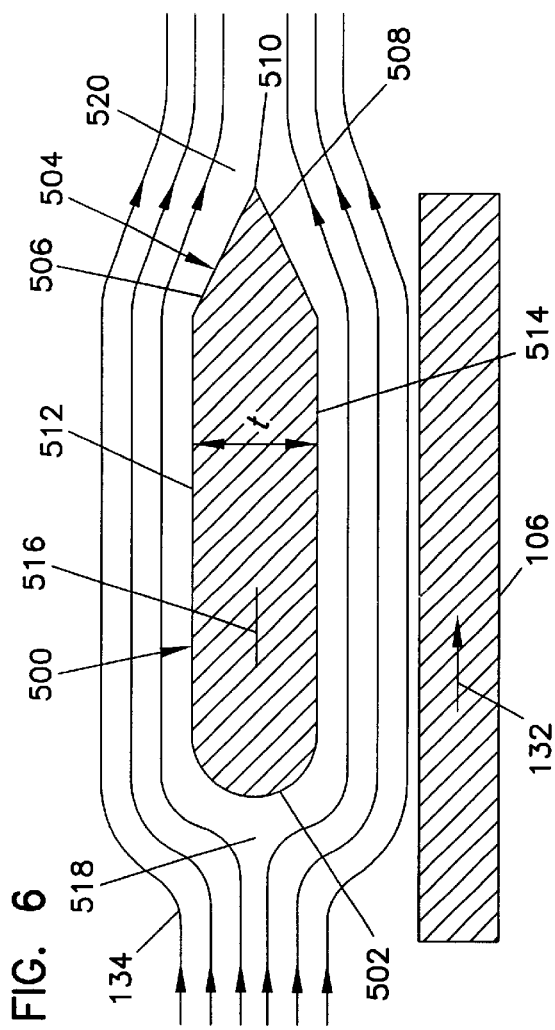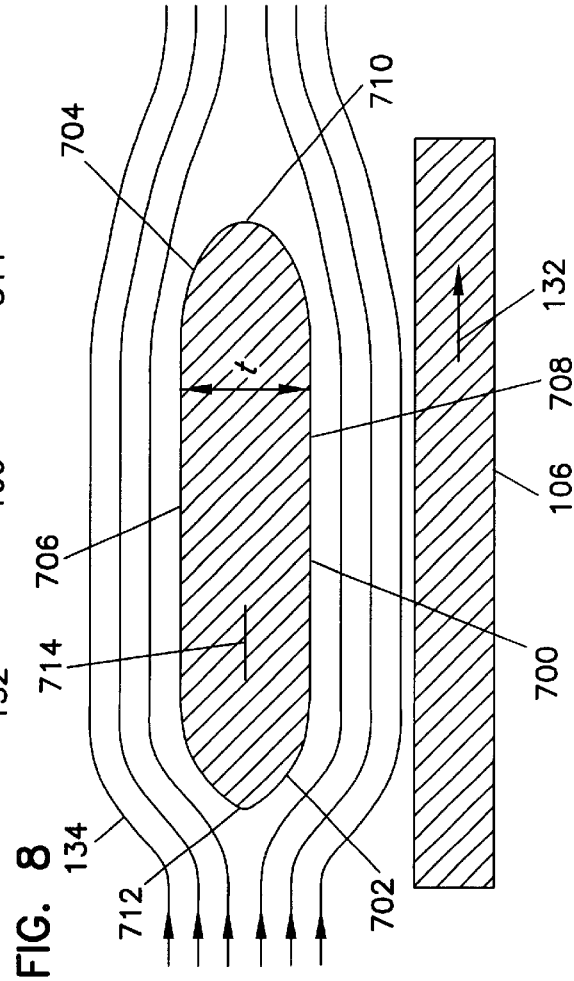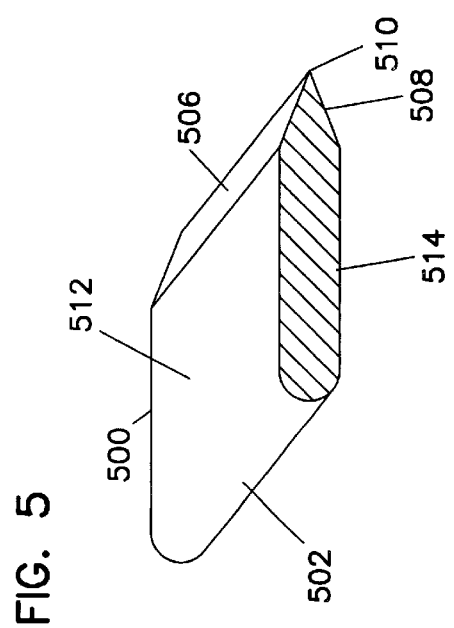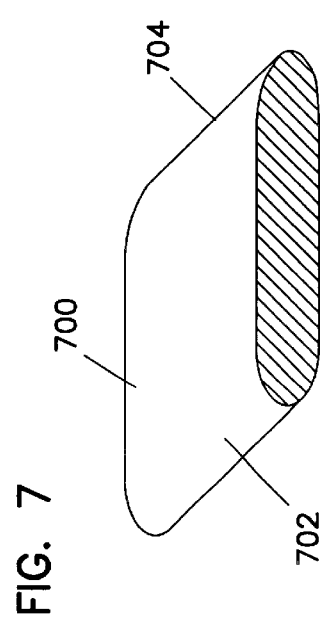

AERODYNAMICALLY STREAMLINED ACTUATOR ARM FOR DISC DRIVES

CROSS-REFERENCE TO RELATED APPLICATION

This application claims the benefit of Provisional Application No. 60/138,702, filed Jun. 11, 1999, for "Streamlined Shape of Actuator Arm" by Mohamed M. Rahman and Hans Leuthold.

FIELD OF THE INVENTION

This invention relates to actuator arms for disc drives, and particularly to actuator arms that are aerodynamic to reduce pressure perturbations within the disc drive.

BACKGROUND OF THE INVENTION

Conventional actuator arms used in disc drives have rectangular cross-sections. The rectangular shape of conventional actuator arms offers substantial resistance to the laminar flow of air associated with a revolving disc. This resistance sheds vortices downstream from the actuator arm, creating a turbulent air flow and vortices in the form of pressure perturbations. These pressure perturbations act as a force against the disc, causing the disc to vibrate in its resonance modes, increasing non-repeatable run-out. Also, the rectangular shape of the actuator arm causes the boundary layer of the flow to separate from the arm just before and just after the actuator arm. A separated flow is inherently unstable and causes pressure perturbations around the actuator arm. These pressure perturbations cause the actuator arm to resonate at its natural frequency, which severely restricts the ability of the servo control system to position the arm accurately relative to the disc surface. This limits the maximum track density in the media.

In addition, the velocity of the air flow is related to the linear velocity of the disc. The linear velocity of the disc is greater at outer tracks than at inner tracks, so the flow velocity of the air varies radially across the disc. Consequently, the pressure perturbations created by actuator arms are different across the disc radius.

The present invention provides a solution to this and other problems, and offers other advantages over the prior art.

SUMMARY OF THE INVENTION

According to one embodiment of the present invention, a disc drive actuator arm is provided to position a head relative to a track on a rotating disc. The actuator arm is an extended arm having a forward edge to engage fluid flow due to rotation of the disc, a rear edge, and a top surface and a bottom surface along which fluid flows. The top and bottom surfaces join the forward and rear edges, and the fluid flow has a boundary layer along the top surface and the bottom surface. The arm has an aerodynamic cross-section so that the boundary layer does not separate at the forward and rear edges.

In preferred embodiments, the forward edge is aerodynamically shaped to minimize pressure increases in front of the arm. In other preferred embodiments, the fluid flow is laminar to prevent shedding vortices.

BRIEF DESCRIPTION OF THE DRAWINGS

FIG. 1 showing the actuator arm positioning the head near an inner track radius of the disc.

FIG. 5 is a perspective view of an aerodynamic actuator arm according to a first embodiment of the present invention.

FIG. 6 is a section view of the actuator arm shown in FIG. 5 illustrating the effect of air flow on the actuator arm and the adjacent disc.

FIGS. 7 and 8 are perspective and section views, respectively of an aerodynamic actuator arm according to a second embodiment of the present invention.

DETAILED DESCRIPTION OF ILLUSTRATIVE EMBODIMENTS

Figure 1:
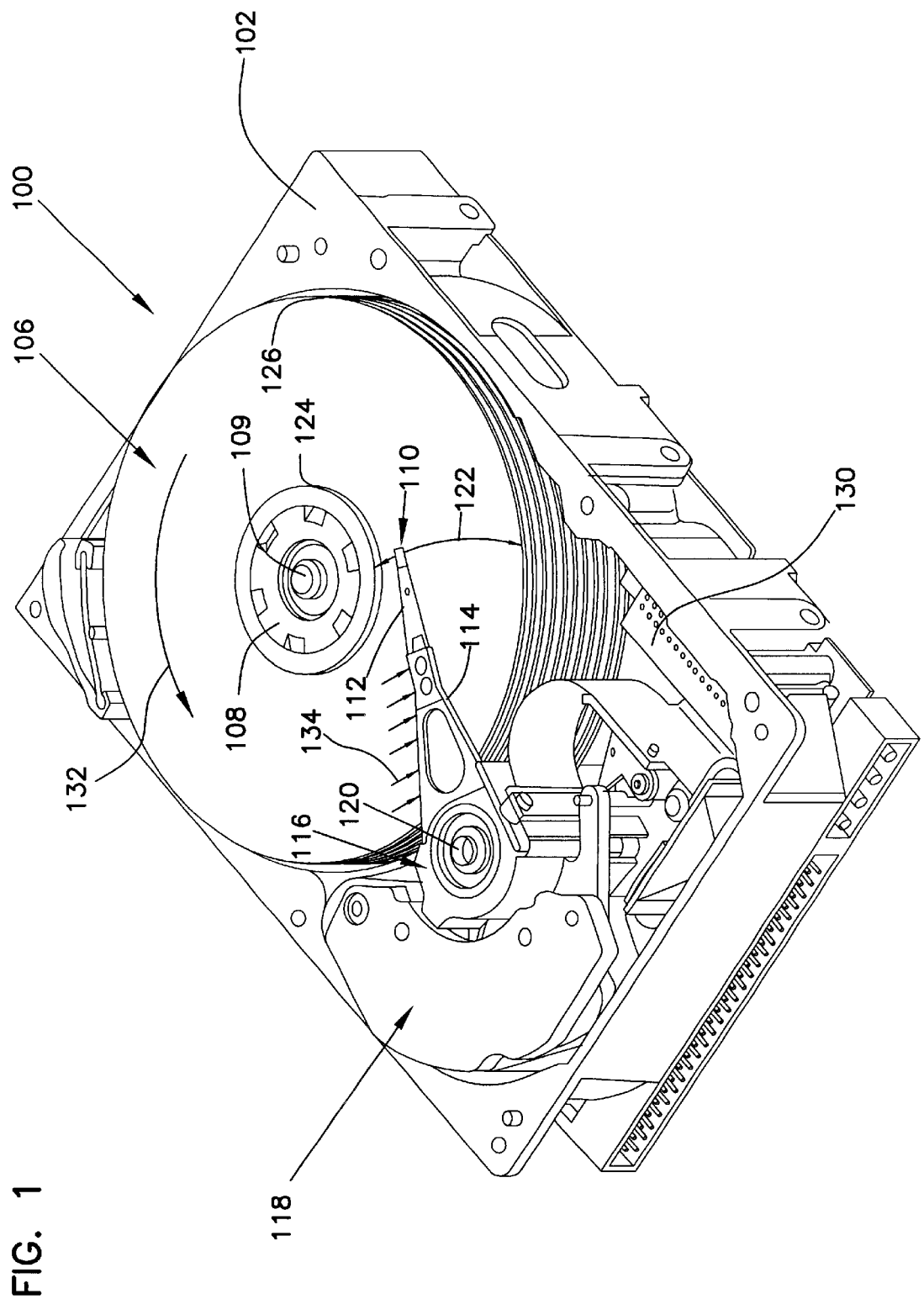
FIG. 1 is a perspective view of a disc drive in which aspects of the present invention may be practiced.

FIG. 1 is a perspective view of a disc drive 100 in which the present invention is useful. Disc drive 100 includes a housing with a base 102 and a top cover (not shown). Disc drive 100 further includes a disc pack 106, which is mounted on a spindle motor (not shown), by a disc clamp 108. Disc pack 106 includes a plurality of individual discs, which are mounted for co-rotation about central axis 109. Each disc surface has an associated disc head-slider 110 that is mounted to disc drive 100 for communication with the confronting disc surface. Head-slider 110 includes a slider structure arranged to fly above the associated disc surface of an individual disc of disc pack 106, and a transducing head arranged to write data to, and read data from, concentric tracks on the confronting disc surface. In the example shown in FIG. 1, head-sliders 110 are supported by flexible suspensions 112 which are in turn attached to track accessing, or actuator, arms 114 of an E-block 116. E-block 116 is driven by a voice coil motor (VCM) 118 to rotate E-block 116 and actuator arms 114, and their attached heads 110, about a pivot shaft 120. Rotation of actuator arms 114 moves the heads along an arcuate path 122 to position the heads over a desired data track between a disc inner diameter 124 and a disc outer diameter 126. Voice coil motor 118 is driven by servo electronics included on circuit board 130 based on signals generated by the heads of head-sliders 110 and a host computer (not shown). Read and write electronics are also included on circuit board 130 to supply signals to the host computer based on data read from disc pack 106 by the read heads of head-sliders 110, and to supply write signals to the write head of head-sliders 110 to write data to the discs.

Figure 2:
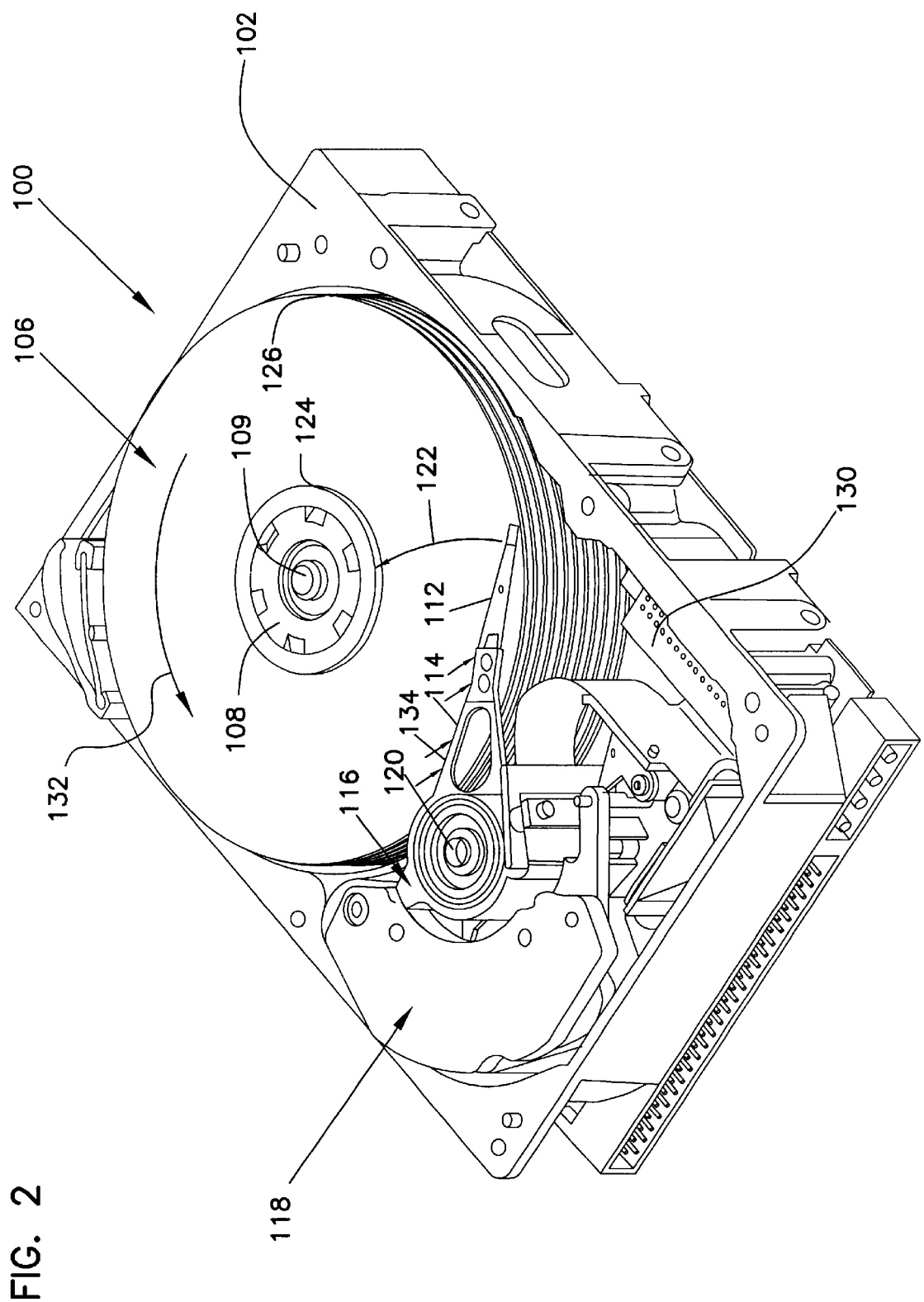
FIG. 2 is a perspective view of the disc drive shown in FIG. 1 showing the actuator arm positioning the head near an outer track radius of the disc.

As disc 106 rotates in the direction of arrow 132, air is carried by the disc to cause an air flow in the same direction. The air flow is generally circular about axis 109, so the linear flow velocity is greater at the outer track 126 than at the inner track 124. The rectangular cross-section of actuator arm 114 engages the flowing air, creating vortices and pressure perturbations. Moreover, when the actuator positions heads 110 to access an inner track 124, as illustrated in FIG. 1, the actuator arm engages the air flow 134 across a substantial portion of the disc radius. As shown in FIG. 2, when the actuator positions heads 110 to access an outer track 126, the actuator arm engages the air flow 134 across a smaller portion of the disc radius. Therefore, the problem of vortices and pressure perturbations is more exasperated when the actuator positions heads 110 adjacent inner tracks.

Figure 3:
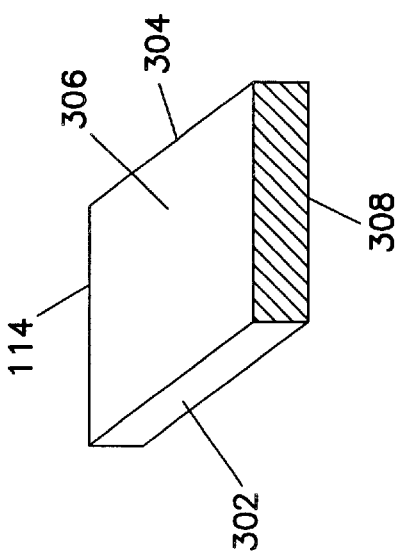
FIG. 3 is a perspective view of a prior art actuator arm.
Figure 4:
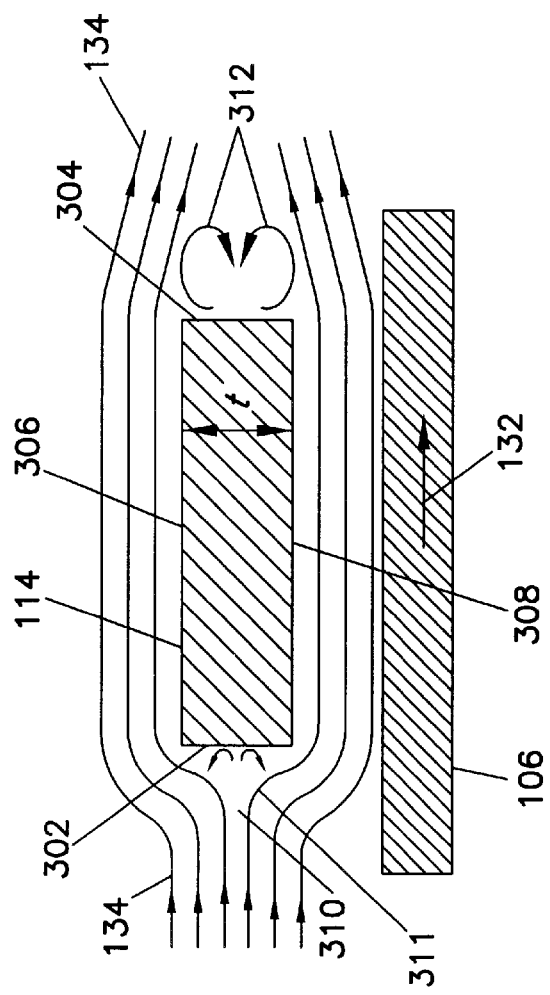
FIG. 4 is a section view of the prior art actuator arm illustrating the effect of air flow on the actuator arm and the adjacent disc.

FIGS. 3 and 4 illustrate the perspective view and flying characteristics of prior art actuator arm 114. Actuator arm 114 has a substantially rectangular cross-section, illustrated in FIGS. 3 and 4, with a forward surface 302 confronting the air flow 134 and a rear surface 304 parallel to forward surface 302 on the opposite side of the arm. Top surface 306 and bottom surface 308 are parallel to each other and normal to forward and rear surfaces 302 and 304. The actuator arm is part of an E-block having one end arranged to rotate about axis 120, and the opposite end arranged to receive suspension 112 and head 110, as shown in FIG. 1.

As illustrated particularly in FIG. 4, the air flow 134 directly meets the forward edge 302 of actuator arm 114. Since surface 302 is substantially normal to the flow, the air flow in region 310 is substantially stagnant. With a stagnant flow, air pressure in region 310 immediately in front of surface 302 is high and equal to a stagnation pressure, forming vortices 311. The forward surface, being normal to the direction of air flow, forces air to flow nearly parallel to surface 302, with one branch of the flow being toward disc 106. Disc 106 is also moving in the direction of arrow 132, parallel to the primary path for air flow 134. Consequently, the disc and air are moving at nearly the same velocity and in the same direction. Consequently, insofar as the disc is concerned, the motion of air at the forward surface 302 is primarily downward, against the disc. At the same time, the substantially normal rear surface 304 strips off vortices 312 adjacent the rear surface 304. Again, because the primary flow path 134 of air is at nearly the same speed and direction as disc 106, the vortices are not centered at a midpoint on the thickness τ on arm 114, but instead are displaced closer to disc 106. The consequence of vortices 311 and 312 adjacent the spinning disc 106 is that vibration of disc 106 is generated, leading to non-repeatable run-out.

Also, the rectangular shape of actuator arm 114 causes the boundary layer of the flow 134 to separate from the arm at or just before forward surface 302 and at or just after rearward surface 304. A separated flow is inherently unstable and causes pressure perturbations around actuator arm 114. These pressure perturbations cause actuator arm 114 to resonate at its natural frequency, which severely restricts the ability of the servo control system to position the arm accurately relative to the disc surface. This limits the maximum track density in the media. The present invention, illustrated in FIGS. 5–12, overcomes the problems of the actuator arm illustrated in FIGS. 3 and 4.

FIGS. 5 and 6 illustrate an actuator arm 500 having a forward surface 502 and a rear edge 504. Forward surface 502 is substantially circular, or elliptical, projected about a mid-plane 516 between the top surface 512 and bottom surface 514. Surfaces 506 and 508 form the rear edge 504 of actuator arm 500, and converge at a point 510 on mid-plane 516, midway between surfaces 512 and 514. Thus, actuator arm 500 is symmetrical about plane 516.

Forward surface 502, being the most forward point of arm 500 at the center plane 516, serves to divert the air flow 134 to a laminar flow from the forward edge of actuator arm 500 and along the top surface 512 and bottom surface 514. Consequently, the flow glides smoothly over the top surface 512 and the bottom surface 514 and build-up of pressure in region 518 is minimized. Point 510 at the rear surface 504 of the arm, also centered on center plane 516, serves to draw the air flow back to the center plane smoothly, thereby maintaining a substantially laminar flow and minimizing vortices and pressure perturbation at region 520. The boundary layer of fluid flow 134 does not separate at the forward edge 502, nor at rear surfaces 504 and 506. The laminar flow adjacent the top and bottom surfaces prevents the shedding of vortices. The aerodynamic cross section of arm 500 helps fluid flow 134 stay laminar as it flows from forward surface 502 to rear surface 504 and thereafter. Consequently, vibration of disc 106 and actuator arm 500 is minimized.

FIGS. 7 and 8 illustrate an actuator arm 700 having a forward surface 702 and a rear surface 704. Forward surface 702 and rear surface 704 are each substantially elliptical, projected about a mid-plane 714 between the top surface 706 and bottom surface 708. Thus, actuator arm 700 is symmetrical about plane 714.

As in the case of the embodiment of FIGS. 5 and 6, forward surface 702, being the most forward point of arm 700 at the center plane 714, serves to divert the air flow 134 to a laminar flow from the forward edge of actuator arm 700 and along the sides top surface 706 and bottom surface 708. Consequently, build up of pressure in region 712 is minimized and the fluid boundary layer does not separate. Rear surface 704, also centered on center plane 516, serves to draw the air flow back to the center plane, thereby keeping the boundary layer from separating and maintaining a substantially laminar flow and minimizing vortices and pressure perturbation at region 710. Consequently, vibration of disc 106 and actuator arm 700 is minimized.

Figure 10:
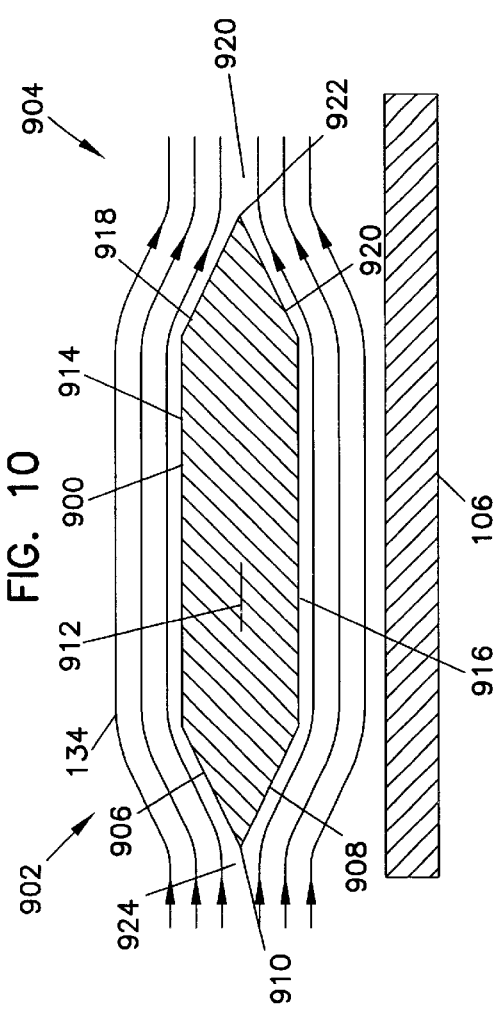
FIGS. 9 and 10 are perspective and section views, respectively of an aerodynamic actuator arm according to a third embodiment of the present invention.
Figure 9:
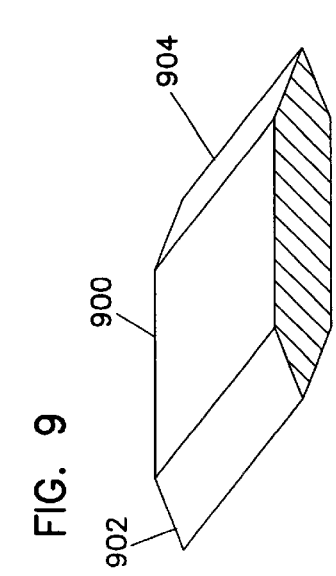

FIGS. 9 and 10 illustrate an actuator arm 900 having a forward edge 902 and a rear edge 904. Forward edge 902 is formed by surfaces 906 and 908 that converge at point 910 on mid-plane 912. Mid-plane 912 is half way between top surface 914 and bottom surface 916. Surfaces 918 and 920 form the rear edge 904 of actuator arm 900, and converge at a point 922 on mid-plane 912, midway between surfaces 914 and 916. Thus, actuator arm 900 is symmetrical about plane 912.

Point 910, being the most forward point of arm 900 at the center plane 912, serves to divert the air flow 134 to a laminar flow from the forward edge of actuator arm 900 and along the top surface 914 and bottom surface 916. Consequently, build up of air pressure in region 924 front of point 910 is minimized and the fluid boundary layer does not separate. Point 922 at the rear edge 904 of the arm, also centered on center plane 912, serves to draw the air flow back to the center plane, thereby keeping the boundary layer from separating and maintaining a substantially laminar flow and minimizing vortices and pressure perturbation at region 926. Consequently, vibration of disc 106 and actuator arm 900 is minimized.

Figure 12:
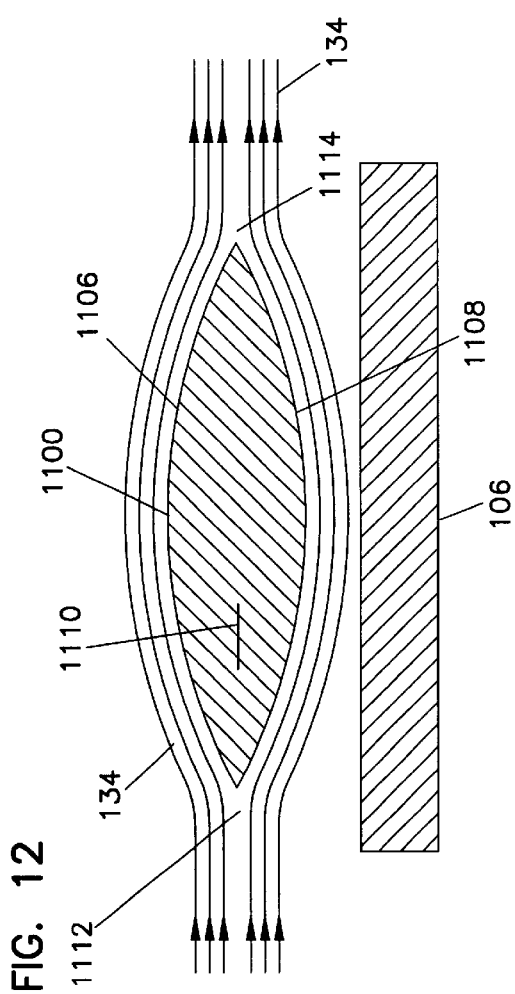
FIGS. 11 and 12 are perspective and section views, respectively of an aerodynamic actuator arm according to a fourth embodiment of the present invention.
Figure 11:
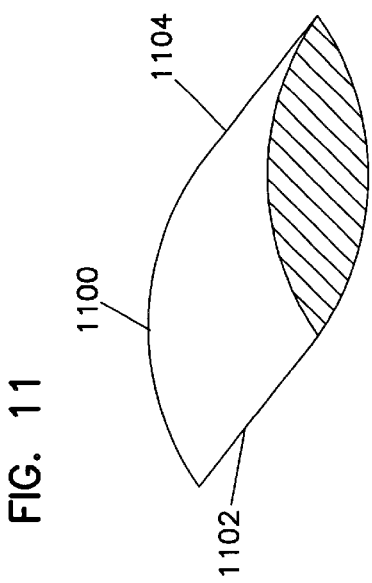

FIGS. 11 and 12 illustrate an actuator arm 1100 having a forward edge 1102 and a rear edge 1104. The top surface 1106 and bottom surface 1108 are substantially elliptical or circular about respective projection lines equidistant from mid-plane 1110 as to form forward edge 1102 and read edge 1104 at mid-plane 1110 between the top surface 1106 and bottom surface 1108. Thus, actuator arm 1100 is symmetrical about plane 1110.

Forward edge 1102, being the most forward point of arm 1100 at the center plane 1110, serves to divert the air flow 134 to a laminar flow from the forward edge of actuator arm 1100 and along the top surface 1106 and bottom surface 1108. Consequently, build up of air pressure in region 1112 in front of edge 1102 is minimized and the fluid boundary layer does not separate. Rear edge 1104, also centered on center plane 1110, serves to draw the air flow back to the center plane, thereby keeping the boundary layer from separating and maintaining a substantially laminar flow and minimizing vortices and pressure perturbation at region 1114. Consequently, vibration of disc 106 and actuator arm 1100 is minimized.

The present invention thus provides a disc drive actuator arm 500, 700, 900, 1100 for positioning a head 110 relative to a track on a rotating disc 106. The actuator arm is an extended arm having forward edge 502, 702, 902, 1102 to engage fluid flow 134 due to rotation of the disc. The arm has a rear edge 504, 704, 904, 1104. Fluid flows along a top surface 512, 706, 914, 1106 and a bottom surface 514, 708, 916, 1108 that join the forward and rear edges. The arm has an aerodynamic cross-section so that the boundary layer of fluid flow does not separate at the forward and rear edges.

A disc drive 100 according to the present invention includes a housing 102 supporting a rotatable recording disc 106. Spindle motor 108 is supported by the housing to rotate disc 106. An actuator assembly includes suspension 112 supporting transducing head 110. An elongated actuator arm supports the suspension within the housing and is movable to position head 110 at a selected radial position adjacent disc 106. The arm has an aerodynamic cross-section formed by forward edge 502, 702, 902, 1102, rear edge 504, 704, 904, 1104, top surface 512, 706, 914, 1106 and bottom surface 514, 708, 916, 1108. Fluid flow 134 due to rotation of disc 106 engages the forward edge and flows across the width of the arm along the top and bottom surfaces past the rear edge.

It is to be understood that even though numerous characteristics and advantages of various embodiments of the present invention have been set forth in the foregoing description, together with details of the structure and function of various embodiments of the invention, this disclosure is illustrative only, and changes may be made in details, especially in matters of structure and arrangement of parts within the principles of the present invention to the full extent indicated by the broad general meaning of the terms in which the appended claims are expressed. For example, particular elements may vary depending on the particular application for the actuator arm while maintaining substantially the same functionality without departing from the scope and spirit of the present invention. While the actuator arm is shown and described as symmetrical about the respective center planes, it may be desirable to provide non-symmetrical flaps and stabilizers to provide stabilization of the air flow. In addition, although the preferred embodiments described herein are directed to specific configurations of symmetrical actuator arms to minimize vortices, it will be appreciated by those skilled in the art that the teachings of the present invention can be applied to other configurations, such as by combining the forward and rear edges in various combinations, to various combinations of configurations along the length of a given actuator arm, and to various types of disc drives including magnetic disc drives, optical disc drives, single-disc disc drives and multiple-disc disc drives, all without departing from the scope and spirit of the invention.

What is claimed is:

1. A disc drive actuator arm for positioning a head relative to a track on a rotating disc, the actuator arm comprising a body of extended length having:

a top surface substantially continuously curved on one side of a mid-plane, the top surface extending from a forward edge to a rear edge, with the forward and rear edges defining a width of the body and the forward edge being arranged to engage the fluid flow due to rotation of the disc so that fluid flows along the top surface to the rear edge, and a bottom surface along which fluid flows, the bottom surface being substantially continuously curved on another side of the mid-plane such that the top surface and the bottom surface are substantially symmetrical about the mid-plane, the bottom surface joined to the top surface at the forward and rear edges, wherein the top and bottom surfaces are so arranged in relation to each other that the fluid flow has a first boundary layer along the top surface and a second boundary layer along the bottom surface, the top and bottom surfaces defining an aerodynamic profile across the width of the body so that the boundary layers do not significantly separate along the top and bottom surfaces or at the forward and rear edges and fluid flow is substantially laminar past the arm from the forward edge to the rear edge to prevent vortex shedding from the rear edge and the top and bottom surfaces; and wherein the top surface and the bottom surface each has an elliptical shape in cross-section so that the forward and rear edges are formed at the intersections of the top and bottom surfaces.

\* \* \* \* \*